(12) United States Patent
Moore et al.

(10) Patent No.: US 9,424,420 B2
(45) Date of Patent: Aug. 23, 2016

(54) RESTRICTING APPLICATION BINARY INTERFACES

(71) Applicant: Red Hat, Inc., Raleigh, NC (US)

(72) Inventors: Paul Moore, Raleigh, NC (US); Dan Walsh, Raleigh, NC (US); Lennart Poettering, Berlin (DE)

(73) Assignee: Red Hat, Inc., Raleigh, NC (US)

( * ) Notice: Subject to any disclaimer, the term of this patent is extended or adjusted under 35 U.S.C. 154(b) by 113 days.

(21) Appl. No.: 13/957,505

(22) Filed: Aug. 2, 2013

(65) Prior Publication Data

US 2015/0040216 A1 Feb. 5, 2015

(51) Int. Cl.
*G06F 21/00* (2013.01)
*G06F 21/52* (2013.01)
*G06F 21/50* (2013.01)
*G06F 21/56* (2013.01)

(52) U.S. Cl.
CPC .............. *G06F 21/52* (2013.01); *G06F 21/50* (2013.01); *G06F 21/566* (2013.01)

(58) Field of Classification Search
CPC ....... H04L 63/02; H04L 63/14; H04L 63/16; G06F 21/05; G06F 21/06
USPC .................. 726/11–17, 26–30; 717/124–161
See application file for complete search history.

(56) References Cited

U.S. PATENT DOCUMENTS

| 7,594,111 B2* | 9/2009 | Kiriansky ............. G06F 21/544 713/166 |
| 7,900,194 B1 | 3/2011 | Mankins |
| 7,945,958 B2 | 5/2011 | Amarasinghe et al. |
| 8,272,048 B2* | 9/2012 | Cooper et al. ................... 726/17 |
| 2006/0021054 A1* | 1/2006 | Costa et al. ..................... 726/25 |
| 2010/0043072 A1 | 2/2010 | Rothwell |
| 2010/0325077 A1* | 12/2010 | Higuchi .......................... 706/47 |
| 2012/0216242 A1 | 8/2012 | Uner et al. |
| 2012/0255004 A1* | 10/2012 | Sallam .................. G06F 21/554 726/23 |
| 2014/0161120 A1* | 6/2014 | Ikaheimo ..................... 370/352 |

FOREIGN PATENT DOCUMENTS

WO 0068790 11/2000

OTHER PUBLICATIONS

Provos, Niels. "Improving Host Security with System Call Policies." Usenix Security. vol. 3. 2003.*
Openwall GNU/*/Linus 3.0—A Small Security-Enhanced Linux Distro for Servers; http://www.openwall.com/lists/kernel-hardening/2012/02/23/5.
Seccomp: Add System Call Filtering Using BPF; http://www.mentby.com/Group/linux-kernel/patch-v10-0511-seccomp-add-system-call-filtering-using-bpf.html.
Watson, et al. CHERI: A Research Platform Deconflating Hardware Virtualization and Protection; http://www.csl.sri.com/users/neumann/2012resolve-cheri.pdf, Mar. 3, 2012.
Schmid et al., Protecting Data from Malicious Software; http://www.acsac.org/2002/papers/28.pdf.

* cited by examiner

*Primary Examiner* — Madhuri Herzog
(74) *Attorney, Agent, or Firm* — Lowenstein Sandler LLP

(57) ABSTRACT

Systems and methods for restricting application binary interfaces. An example method may comprise: initializing, by a process spawned by a kernel of an operating system running on a computer system, a system call filter inhibiting at least one type of application binary interface (ABI) calls; receiving a system call issued by a user space program executed by the computer system; intercepting the system call by the system call filter; determining that the system call is disabled by the system call filter; and performing a pre-determined action with respect to the system call.

20 Claims, 3 Drawing Sheets

RESTRICTING APPLICATION BINARY INTERFACES

TECHNICAL FIELD

The present disclosure is generally related to computer systems, and is more specifically related to systems and methods for restricting application binary interfaces.

BACKGROUND

An application binary interface (ABI) defines how a user space program may interact with the underlying operating system or another program. An ABI may include, e.g., requirements to sizes, layout, and alignment of data types; procedure calling conventions; and/or binary formats of object, executable and library files. An ABI may also define a system call interface allowing a user space program invoke operating system functions.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for restricting application binary interfaces of computer systems. Numerous system calls are typically available to a user space program via an application binary interface (ABI) implemented by a computer system, thus forming a large kernel attack surface. In order to reduce the latter, the application binary interface (ABI) implemented by a computer system may be restricted in situations when certain types of system calls are known to be unnecessary for a particular user space program or a group of user space programs.

ABI restrictions may be implemented by inhibiting one or more system calls which otherwise might become targets for a potential attacker. System call filtering may be provided, e.g., by implementing, for a particular user space program or a group of user space programs, a Berkley Packet Filtering (BPF) mechanism, as described in more details herein below.

In certain conventional systems, a filter for selectively inhibiting system calls may be activated by a user space program upon its initialization, thus preventing the user space program and its child processes from issuing one or more pre-defined system calls. However, this approach might be ineffective, e.g., against an attack that involves spawning, by a privileged process, a user space program containing malicious code exploiting one or more system calls.

Aspects of the present disclosure address the above noted and other deficiencies of the application-initialized system call filtering, by activating a system call filter by a process directly spawned by the operating system kernel (such as a system initialization process), so that the system call filter would apply to system calls issued by any user space applications executed by the computer system. The system call filter may be programmed to filter out one or more system calls, by intercepting all system calls issued by user space programs. Responsive to determining that a system call is inhibited by an active system call filter, the computer system may perform a pre-determined action (e.g., terminate the user space program which initiated the system call, issue a pre-defined signal to the user space program which initiated the system call, return a pre-defined error code to the user space program which initiated the system call, or generate a system trace event).

In another aspect, a computer system employing certain processor architectures may implement two or more ABIs, e.g., a 32-bit ABI and a 64-bit ABI. In certain system configurations, a system call filter may be programmed to inhibit the 32-bit ABI, thus significantly restricting the kernel attack surface. Various aspects of the above referenced methods and systems are described in details herein below by way of examples, rather than by way of limitation.

Figure 1:
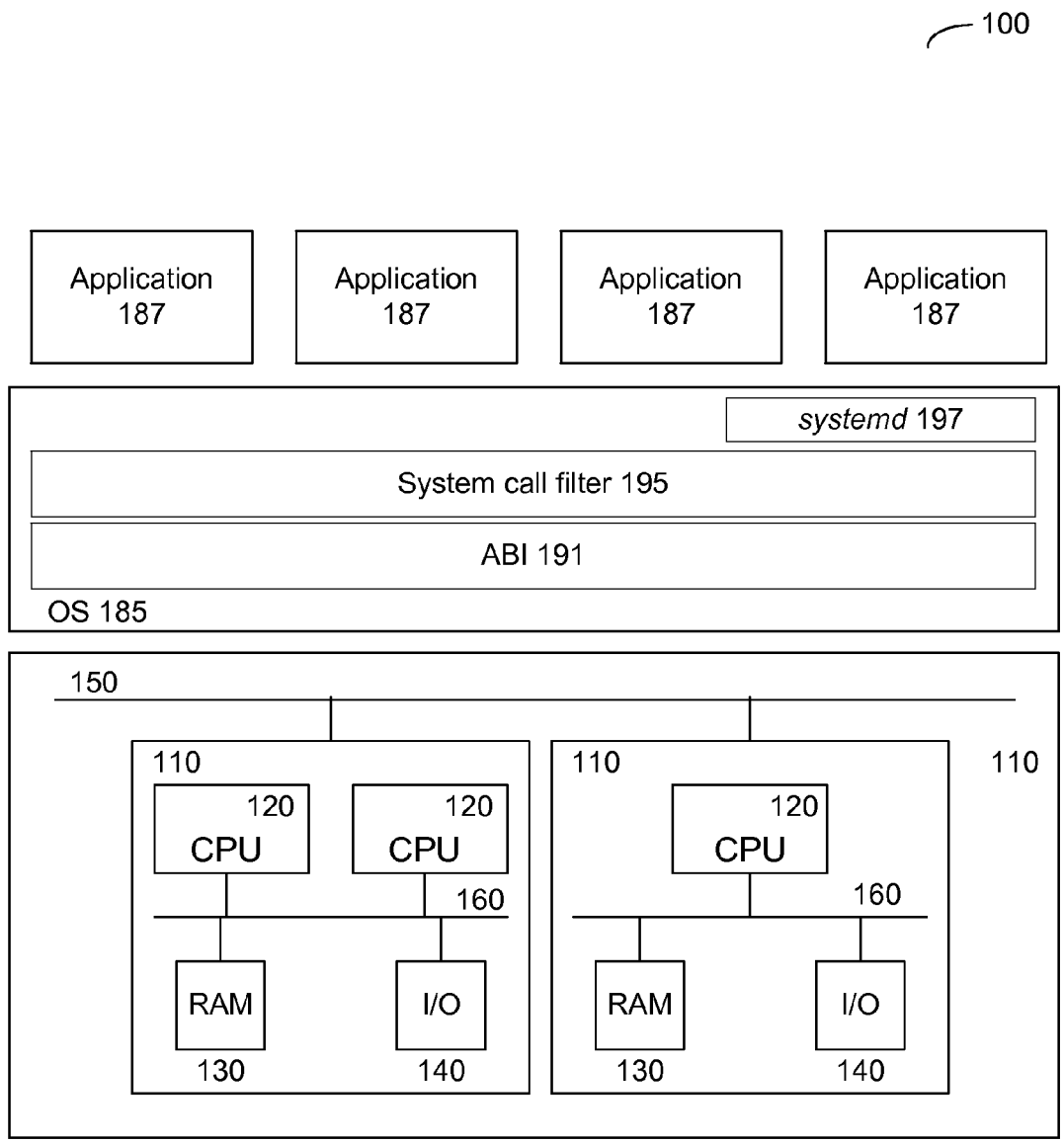
FIG. 1 schematically depicts component diagrams of example computer systems, in accordance with one or more aspects of the present disclosure.

FIG. 1 schematically depicts a high-level component diagram of an example computer system 100 in accordance with one or more aspects of the present disclosure. The computer system 100 may include one or more interconnected nodes 110. "Node" herein shall refer to a group of one or more processors and one or more associated memory devices locally accessible by the processors in the group. Each node 110 may in turn include one or more physical processors 120 communicatively coupled to memory devices 130 and input/output (I/O) devices 140.

"Physical processor" or "processor" herein shall refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Processors 120 may be interconnected using a variety of techniques, ranging from a point-to-point processor interconnect, to a system area network 150, as shown in FIG. 1. Local connections within each node 110, including the connections between a processor 120 and a memory 130 and between a processor 120 and an I/O device 140 may be provided by one or more local buses 160 of suitable architecture, for example, PCI. One or more applications 187 may be executed by the computer system 100 under an operating system 185.

In certain implementations, computer system 100 may implement an application binary interface (ABI) 191 defining a system call interface allowing user space programs 187 execute kernel-level functions of the operating system 185. In certain implementations, the processors 120 may be provided by 64-bit processors, and hence the computer system 100 may implement a 64-bit ABI. In certain implementations, the computer system 100 may additionally implement a 32-bit ABI affording certain user space programs numerous benefits of the 64-bit processor architecture (e.g., larger number of processor registers, better floating-point performance, etc.) while using 32-bit pointers and thus avoiding the overhead of 64-bit pointers and decreasing the memory footprint of a running user space program.

However, implementing both 32-bit and 64-bit ABIs significantly widens the kernel attack surface, which may include a plurality of system calls executable by a user space program. In order to reduce the kernel attack surface, the ABI may be restricted by disabling one or more system calls, and thus thwarting potential attacks which would otherwise exploit the disabled system calls.

To disable one or more system calls, the computer system 100 may implement system call filtering. In certain implementations, a user space program may activate a filter to evaluate, prior to executing, system calls issued by the user space program. Alternatively, a system call filter 195 may be activated by a process 197 directly spawned by the kernel of the operating system 187, as described in more details herein below.

In one illustrative example, seccomp filtering mechanism may be employed to specify a BPF filter for the system call issued by user space programs. The BPF mechanism is known in the art for implementing raw interfaces to data link layers allowing inspection of link-layer network packets which are sent and received by a network interface. In other implementations, the BPF mechanism may be employed to inspect the system call information, rather than that of network packets. In one illustrative example, the BPF mechanism may be employed to inspect the contents of system registers. Thus, a BPF-based filter may be implemented to intercept all system calls and allow or disallow an intercepted system call to proceed based on inspecting system register values which are expected to contain an identifier and parameters of the system call.

A system call filter can comprise one or more filter rules. A filter rule may define actions to be taken by the system with respect to a particular system call. In certain implementations, a filter rule may be defined to apply to a particular system call and certain argument values. In one illustrative example, a filter rule may restrict a particular system call to only using certain values for system call arguments. The system call filter may be programmed to determine the values of system call arguments by inspecting system registers upon intercepting a system call attempted by a user space program.

Responsive to determining that a system call is inhibited by an active system call filter, the computer system 100 may perform certain actions with respect to the user space program which initiated the system call, as prescribed by the applicable filter rule. For example, the computer system 100 may terminate the user space program which initiated the system call intercepted by the system call filter. In certain implementations, the computer system 100 may issue a pre-defined signal to the user space program which initiated the system call intercepted by the system call filter. In one example, the computer system 100 may issue a SIGILL signal to the user space program which initiated the system call intercepted by the system call filter, indicating that the user space program attempted to execute a malformed, unknown, or privileged instruction. In another example, the computer system 100 may issue a SIGKILL signal to the user space program which initiated the system call intercepted by the system call filter, causing the user space program to terminate immediately. In another example, the computer system 100 may issue a SIGTERM signal to the user space program which initiated the system call intercepted by the system call filter, requesting the user space program termination. In another example, the computer system 100 may issue a SIGUSRn signal to the user space program which initiated the system call intercepted by the system call filter, indicating a user-defined condition. In another example, the computer system 100 may issue a SIGSYS signal to the user space program which initiated the system call intercepted by the system call filter, indicating that the user space program attempted to pass a bad argument to a system call.

In certain implementations, the computer system 100 may generate a system trace event responsive to determining that a system call is inhibited by an active system call filter. Other types of actions to be performed by the computer system 100 with respect to the user space program which initiated the system call intercepted by an active system call filter may be prescribed by the applicable filter rule.

As noted herein above, in certain implementations, a BPF for selectively filtering system calls may be activated by a user space program upon its initialization, thus preventing the user space program and its child processes from issuing one or more pre-defined system calls. However, this approach might be ineffective, e.g., against an attack that involves spawning, by a privileged process, a user space program containing malicious code exploiting one or more system calls. To prevent this scenario, a system call filter that would apply to system calls issued by any user space applications may be activated by a process 197 directly spawned by the kernel of the operating system 185 (such as a system initialization process), as schematically illustrated by FIG. 1. In one illustrative example, a system call filter may be initialized by init daemon. In another illustrative example, a system call filter may be initialized by systemd daemon.

The system call filter may be programmed to filter out one or more system calls, by intercepting all system calls issued by user space programs. In certain implementations, when certain types of system calls are known to be unnecessary for a particular user space program or a group of user space programs, the system call filter may be programmed to inhibit one or more ABIs. In one illustrative example, for a computer system implementing a 32-bit ABI and a 64-bit ABI, the system call filter may be programmed to inhibit 32-bit ABI calls, thus significantly reducing the potential kernel attack surface.

Figure 2:
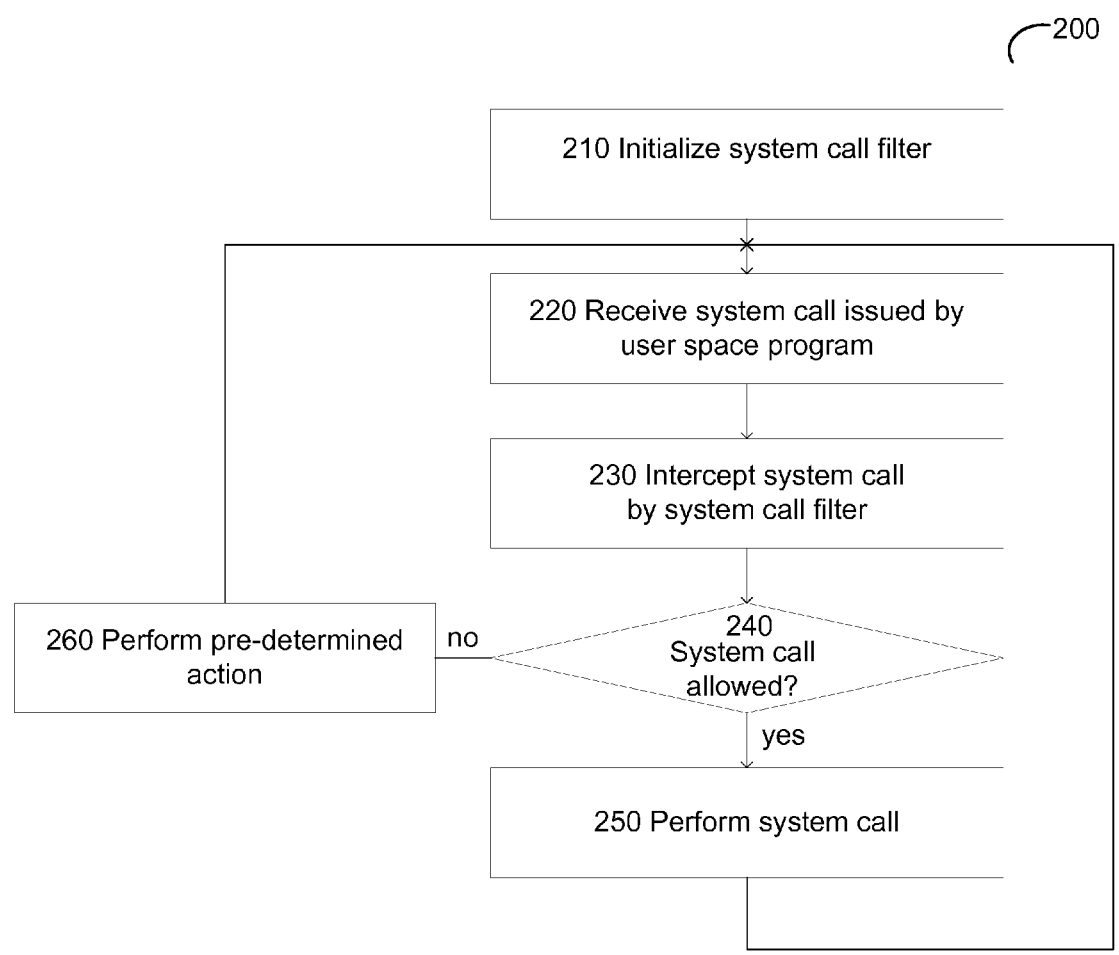
FIG. 2 depicts a flow diagram of an example method for restricting application binary interfaces, in accordance with one or more aspects of the present disclosure.

FIG. 2 depicts a flow diagram of an example method 200 for restricting application binary interfaces of computer systems. The method 200 may be performed by a computer system that may comprise hardware (e.g., circuitry, dedicated logic, and/or programmable logic), software (e.g., instructions executable on a computer system to perform hardware simulation), or a combination thereof. The method 200 and/or each of its individual functions, routines, subroutines, or operations may be performed by one or more physical processors of the computer system executing the method.

At block 210, a process directly spawned by a kernel of an operating system running on the computer system 100 of FIG. 1 may initialize a system call filter. As noted herein above, in one illustrative example, the system call filter may be initialized by init daemon. Alternatively, the system call filter may be initialized by systemd daemon. In certain implementations, the system call filter may be implemented using BPF mechanism, as described in more details herein above. In one illustrative example, the system call filter may be programmed to inhibit 32-bit ABI calls, thus significantly reducing the potential kernel attack surface.

At block 220, the computer system may receive a system call issued by a user space program.

At block 230, the computer system may intercept the system call by the system call filter.

Responsive to determining, at block 240, that the system call is allowed by the active system call filter, the computer system may, at block 250, perform the function specified by the system call. Upon completing the operations referenced by block 250, the method may loop back to block 220.

Alternatively, responsive to determining, at block 240, that the system call is inhibited by the active system call filter, the computer system may, at block 260, a pre-determined action with respect to the system call. In certain implementations, the computer system may terminate the user space program which initiated the system call, issue a pre-defined signal to the user space program which initiated the system call, return a pre-defined error code to the user space program which initiated the system call, or generate a system trace event, as described in more details herein above. Upon completing the operations referenced by block 250, the method may loop back to block 220.

Figure 3:
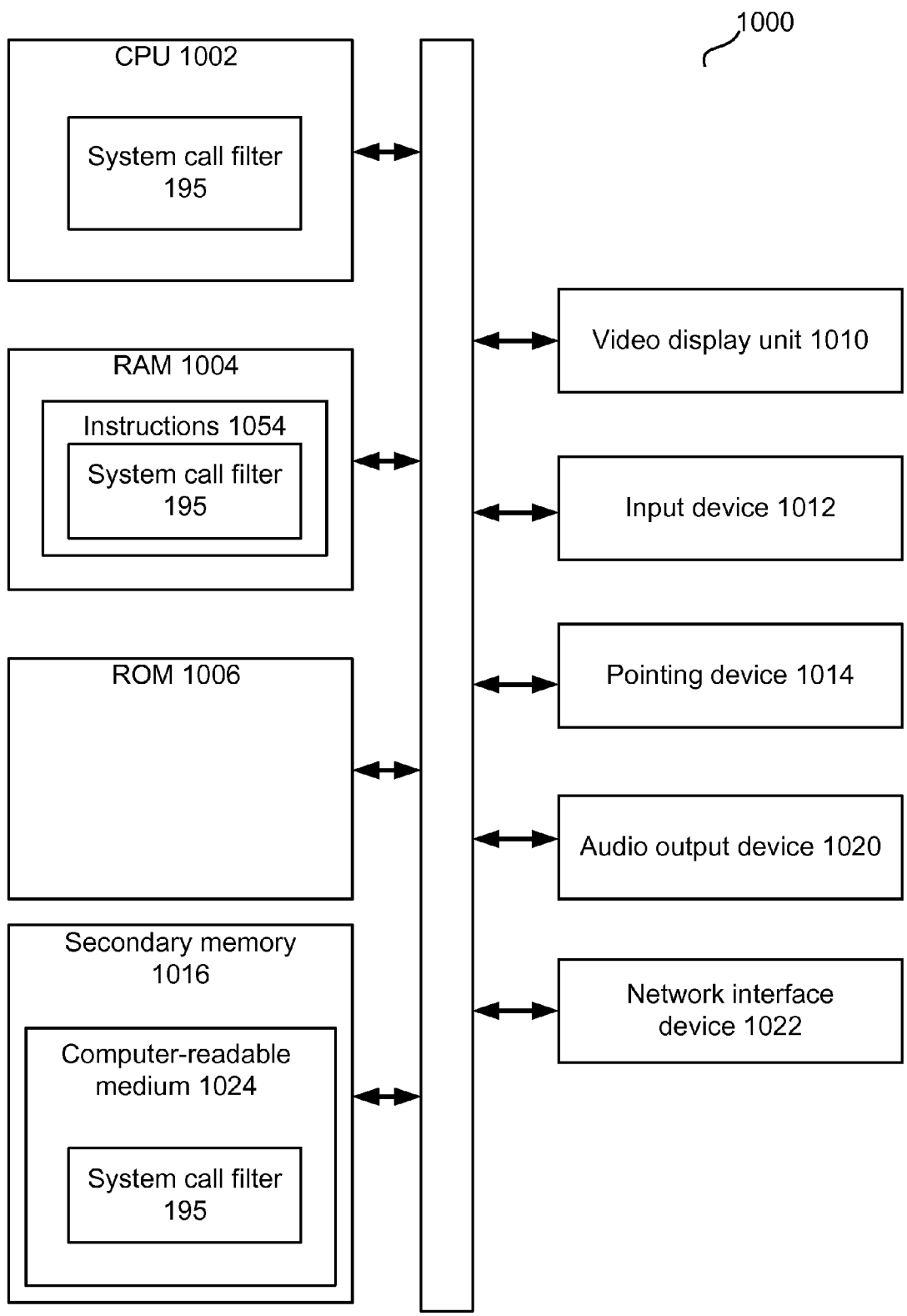
FIG. 3 depicts an illustrative computer system operating in accordance with examples of the invention.

FIG. 3 depicts an illustrative computer system operating in accordance with examples of the invention. In one example, computer system 1000 may correspond to the computer system 100 of FIG. 1.

In one example, the computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alpha-numeric input device 1012 (e.g., a keyboard), a pointing device 1014 (e.g., a mouse), and an audio output device 1020 (e.g., a speaker).

The secondary memory 1016 may include a tangible computer-readable storage medium 1024 on which may be stored instructions 1054 encoding the system call filter 195 for restricting application binary interfaces of computer systems. The instructions 1054 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform the method 200 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

The invention claimed is:

1. A method, comprising:
   initializing, by a process initiated by a kernel of an operating system, a system call filter restricting at least one type of application binary interface (ABI) calls, wherein the system call filter is provided by a Berkley Packet Filter (BPF);
   receiving, by a processor, a system call issued by a user space program;
   intercepting the system call by the system call filter;
   inspecting, by the BPF, a value of a system register representing at least one of: an identifier of the system call or a parameter of the system call; and
   responsive to determining that the system call is associated with a 32-bit ABI in view of inspecting the value of the system register, performing, by the processor, a defined action with respect to the system call.

2. The method of claim 1, wherein the defined action comprises one of: terminating the user space program, issuing defined signal, returning a defined error code, or generating a trace event.

3. The method of claim 1, wherein the defined action is specified by the system call filter.

4. The method of claim 1, wherein the process is provided by a system initialization process.

5. The method of claim 1, wherein the system call filter is to inhibit 32-bit ABI calls.

6. A system, comprising:
   a memory; and
   a processor, operatively coupled to the memory, to:
   initialize, by a process initiated by a kernel of an operating system, a system call filter restricting at least one type of ABI calls, wherein the system call filter is provided by a Berkley Packet Filter (BPF);
   receive a system call issued by a user space program;
   intercept the system call by the system call filter;
   inspect, by the BPF, a value of a system register representing at least one of: an identifier of the system call or a parameter of the system call; and
   responsive to determining that the system call is associated with a 32-bit ABI in view of inspecting the value of the system register, perform a defined action with respect to the system call.

7. The system of claim 6, wherein the defined action comprises one of: terminating the user space program, issuing a defined signal, returning a defined error code, or generating a trace event.

8. The system of claim 6, wherein the defined action is specified by the system call filter.

9. The system of claim 6, wherein the process is provided by a system initialization process.

10. The system of claim 6, wherein the system call filter is to inhibit 32-bit ABI calls.

11. A non-transitory computer-readable storage medium comprising executable instructions to cause a processor to:
    initialize, by a process initiated by a kernel of an operating system, a system call filter restricting at least one type of ABI calls, wherein the system call filter is provided by a Berkley Packet Filter (BPF);
    receive, by the processor, a system call issued by a user space program;
    intercept the system call by the system call filter;
    inspect, by the BPF, a value of a system register representing at least one of: an identifier of the system call or a parameter of the system call; and
    responsive to determining that the system call is associated with a 32-bit ABI in view of inspecting the value of the system register, perform, by the processor, a defined action with respect to the system call.

12. The non-transitory computer-readable storage medium of claim 11, wherein the defined action comprises one of: terminating the user space program, issuing a defined signal, returning a defined error code, or generating a trace event.

13. The non-transitory computer-readable storage medium of claim 11, wherein the process is provided by a system initialization process.

14. The non-transitory computer-readable storage medium of claim 11, wherein the system call filter is to inhibit 32-bit ABI calls.

15. The method of claim 1, wherein the defined action comprises restricting the system call to using a certain argument value.

16. The system of claim 6, wherein the defined action comprises restricting the system call to using a certain argument value.

17. The non-transitory computer-readable storage medium of claim 11, wherein the defined action comprises restricting the system call to using a certain argument value.

18. The method of claim 1, wherein the processor implements a 32-bit ABI and a 64-bit ABI.

19. The system of claim 6, wherein the processor is further to implement a 32-bit ABI and a 64-bit ABI.

20. The non-transitory computer-readable storage medium of claim 11, wherein the processor is further to implement a 32-bit ABI and a 64-bit ABI.

* * * * *